(12) United States Patent
Willemsen et al.

(10) Patent No.: US 8,633,792 B2
(45) Date of Patent: Jan. 21, 2014

(54) ELECTRONIC DEVICE HAVING A BASE PART INCLUDING A SOFT MAGNETIC LAYER

(75) Inventors: Oscar Hendrikus Willemsen, Eindhoven (NL); Eberhard Waffenschmidt, Aachen (DE); Petrus Johannes Bremer, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/392,106

(22) PCT Filed: Sep. 1, 2010

(86) PCT No.: PCT/IB2010/053923
§ 371 (c)(1),
(2), (4) Date: Feb. 24, 2012

(87) PCT Pub. No.: WO2011/030256
PCT Pub. Date: Mar. 17, 2011

(65) Prior Publication Data
US 2012/0154086 A1 Jun. 21, 2012

(30) Foreign Application Priority Data

Sep. 9, 2009 (EP) .................... 09169831

(51) Int. Cl.
*H01F 5/00* (2006.01)
*H01F 27/30* (2006.01)
*H02J 7/00* (2006.01)
*H01L 27/08* (2006.01)

(52) U.S. Cl.
USPC ........... 336/200; 336/205; 336/208; 320/107; 257/531

(58) Field of Classification Search
USPC .......... 336/200, 205, 208; 320/107, 108, 114, 320/115; 257/531
See application file for complete search history.

(56) References Cited

U.S. PATENT DOCUMENTS

| | | | | |
|---|---|---|---|---|
| 3,493,909 A * | 2/1970 | Beverly | ................... | 336/178 |
| 7,551,052 B2 * | 6/2009 | Jow et al. | ................... | 336/84 M |
| 7,948,208 B2 * | 5/2011 | Partovi et al. | ................... | 320/108 |
| 8,248,025 B2 * | 8/2012 | Sip | ................... | 320/108 |
| 8,446,243 B2 * | 5/2013 | Strzalkowski et al. | ........ | 336/200 |
| 2007/0223217 A1 | 9/2007 | Hsu | | |
| 2007/0279002 A1 | 12/2007 | Partovi | | |
| 2008/0129246 A1 | 6/2008 | Morita et al. | | |
| 2008/0164840 A1 * | 7/2008 | Kato et al. | ................... | 320/108 |
| 2008/0164844 A1 * | 7/2008 | Kato et al. | ................... | 320/114 |
| 2009/0121675 A1 | 5/2009 | Ho et al. | | |
| 2009/0154148 A1 | 6/2009 | Meyer et al. | | |
| 2010/0181842 A1 * | 7/2010 | Suzuki et al. | ................... | 307/104 |

FOREIGN PATENT DOCUMENTS

| | | | |
|---|---|---|---|
| FR | 2695285 A3 | 3/1994 | |
| WO | 2008012702 A1 | 1/2008 | |
| WO | WO 2008156025 A1 * | 12/2008 | |
| WO | 2009105615 A2 | 8/2009 | |

* cited by examiner

*Primary Examiner* — Alexander Talpalatski
*Assistant Examiner* — Joselito Baisa
(74) *Attorney, Agent, or Firm* — Mark L. Beloborodov

(57) ABSTRACT

An electronic device (1) is provided with at least a base part (2, 22, 32, 42) and an electronic module (3). The base part (2, 22, 32, 42) comprises a soft magnetic layer (5, 25, 35, 45) and at least a primary coil (7). The electronic module (3) comprises at least one electronic element and at least a secondary coil (8) adapted to inductively interact with the primary coil (7). The primary coil (7) is located in a hole (6) of the soft magnetic layer (5, 25, 35, 45). The electronic module (3) further comprises at least one magnet (9) adapted to magnetically interact with the soft magnetic layer (5, 25, 35, 45).

16 Claims, 3 Drawing Sheets

ELECTRONIC DEVICE HAVING A BASE PART INCLUDING A SOFT MAGNETIC LAYER

FIELD OF THE INVENTION

The invention relates to an electronic device being provided with at least a base part and an electronic module, which base part comprises a soft magnetic layer and at least a primary coil, whereas the electronic module comprises at least one electronic element and at least a secondary coil adapted to inductively interact with the primary coil.

The invention also relates to a base part and an electronic element suitable for use in such an electronic device.

BACKGROUND OF THE INVENTION

In such an electronic device, which is known from WO/2008/012702 A1, the base part comprises a soft magnetic layer to improve the inductive coupling between the primary and secondary coil. The base part is provided with a number of primary coils.

Positioning elements are provided on both the base part and the electronic module to place the electronic module on the base part in a predefined position so that the inductive coupling between the primary coil and the secondary coil is at the optimum. Furthermore, the positioning elements hold the electronic module at its place on the base part.

SUMMARY OF THE INVENTION

It is an object of the invention to provide an electronic device wherein a fixation between the electronic module and the base part is improved.

This object is accomplished with the electronic device according to the invention in that the primary coil is located in a hole of the soft magnetic layer, whereas the electronic module further comprises at least one magnet adapted to magnetically interact with the soft magnetic layer.

Since the primary coil is located in a hole of the soft magnetic layer, the primary coil and the soft magnetic layer can be located in the same plane due to which both the distance between the primary coil and the secondary coil as well as the distance between the soft magnetic layer and the magnet can be relatively small. Due to the relatively small distance between the primary coil and the secondary coil, a good inductive power transmission will be obtained. Due to the relatively small distance between the soft magnetic layer and the magnet, a strong magnetic fixation will be obtained. The magnet can be a permanent magnet or an electromagnet.

An embodiment of the electronic device according to the invention is characterized in that the primary coil and the hole are round, wherein the diameter of the hole is at least 10% and preferably 25% larger than the diameter of the primary coil.

Due to the difference in diameter, eddy currents in the soft magnetic layer are effectively prevented.

Another embodiment of the electronic device according to the invention is characterized in that the hole in the soft magnetic layer is a through hole.

Such a through hole can easily be provided in the soft magnetic layer. A substrate can be positioned on a side of the soft magnetic layer facing away from the electronic module, wherein the primary coil is being supported by the substrate.

Yet another embodiment of the electronic device according to the invention is characterized in that the hole in the soft magnetic layer is a blind hole.

A better magnetic coupling can be obtained in this manner. In such a case the backside of the primary coil is preferably shielded to prevent eddy currents in the remaining part of the soft magnetic layer in the blind hole. The blind hole can also be partly filled with a soft magnetic material suitable for alternating magnetic fields, like ferrite or a ferrite polymer compound (FPC).

A further embodiment of the electronic device according to the invention is characterized in that the soft magnetic layer comprises at least one slit extending from the hole.

Such a slit will prevent unwanted eddy currents in the soft magnetic layer.

When providing the soft magnetic layer with slits, the difference in diameter between the hole and the primary coil can be reduced. By reducing said difference, more surface area of the soft magnetic layer is available for attaching the magnet thereto.

Yet a further embodiment of the electronic device according to the invention is characterized in that the soft magnetic layer comprises a number of slits extending radially from the hole.

Since the radially extending slits are arranged perpendicularly to the path of the eddy currents which would flow in the absence of the slits, an optimal reduction of the eddy currents is obtained.

Yet a further embodiment of the electronic device according to the invention is characterized in that the soft magnetic layer is provided with a number of primary coils located in holes, wherein at least one slit extends between adjacent holes.

By having one slit per two holes, the soft magnetic layer can be kept together as one piece. When more slits extend from one hole to a number of adjacent holes, the soft magnetic layer will be separated in several pieces. In such a case the soft magnetic layer can be attached to a substrate.

Yet a further embodiment of the electronic device according to the invention is characterized in that the dimensions of the primary coil and the secondary coil are about the same.

As the dimensions of the primary coil and the secondary coil are about the same, such as the same diameter, an optimal coupling factor between the primary coil and the secondary coil will be obtained.

Yet a further embodiment of the electronic device according to the invention is characterized in that the electronic module comprises at least one permanent magnet.

By using a permanent magnet instead of an electromagnet no power of the primary coil is needed for holding the electronic module against the base part. Furthermore, by using a permanent magnet the risk that the electronic module will fall off the base part in case of a power failure is easily avoided.

Preferably the permanent magnets are located around the secondary coil at a regular spacing, such that for example three permanent magnets are located in a triangle around the secondary coil or four permanent magnets are located in a square around the secondary coil to easily align the secondary coil of the electronic module with one of the primary coils of the base part.

Yet a further embodiment of the electronic device according to the invention is characterized in that the permanent magnet is magnetized normal to the soft magnetic layer.

With such a direction of the magnetic field of the permanent magnet a good magnetic fixation can be obtained with relatively small magnets.

BRIEF DESCRIPTION OF THE DRAWINGS

The invention will be explained in more detail with reference to the drawing, in which.

DETAILED DESCRIPTION OF EMBODIMENTS

In the figures, like parts are indicated with the same numerals.

Figure 1A:
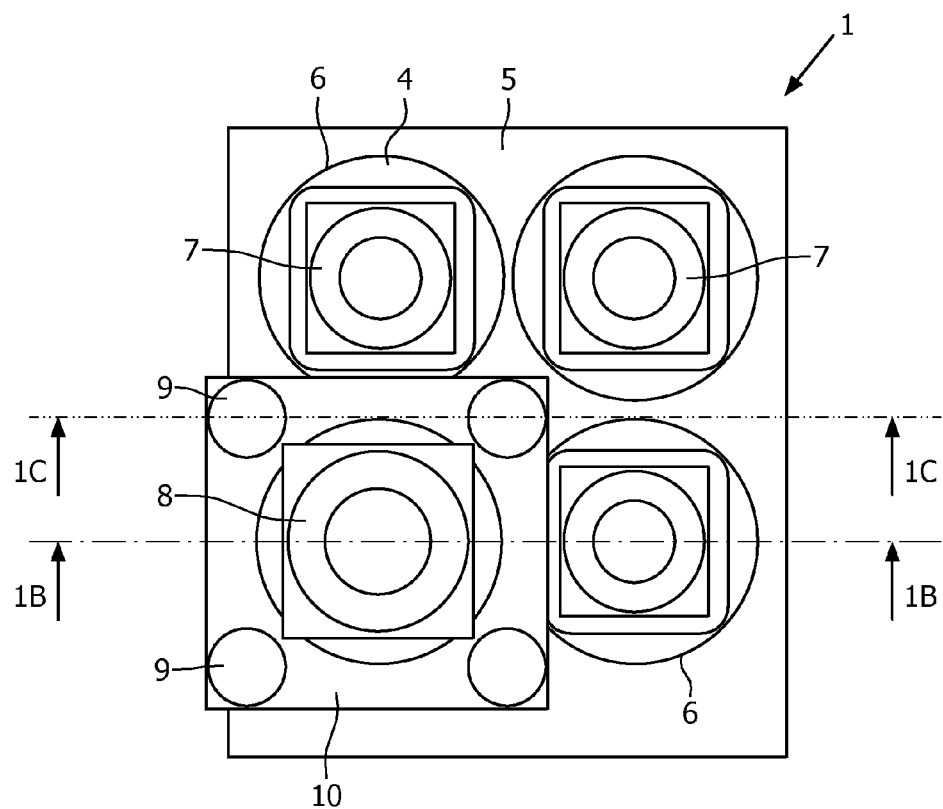
FIG. 1A-1C are a top view and cross sections of a first embodiment of the electronic device according to the invention.
Figure 1B:
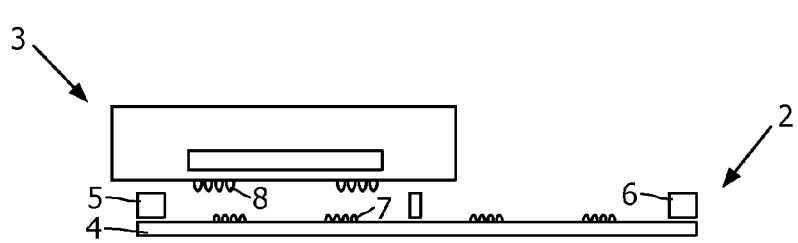
Figure 1C:
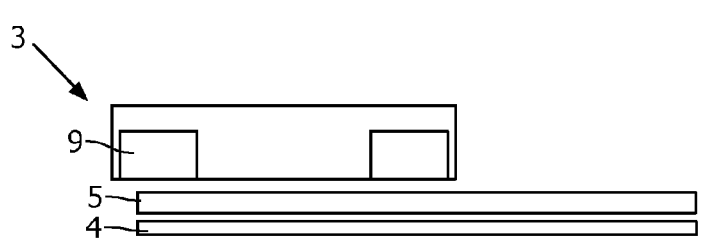

FIGS. 1A-1C show a first embodiment of an electronic device 1 according to the invention. The electronic device 1 comprises a base part 2 and an electronic module 3.

The base part 2 comprises a non-conducting and non-magnetic substrate 4 like a printed circuit board (PCB) kind of substrate, a soft magnetic layer 5 provided with a number of through holes 6 and a number of primary coils 7. The soft magnetic layer 5 is preferably 0.5-2 mm thick, whereas the primary coil 6 is preferably 0.2-2 mm thick. Each primary coil 7 is located in a hole 6 and is mounted on the substrate 4. The holes 6 are arranged in an array with rows and columns.

The electronic module 3 comprises a secondary coil 8 and four permanent magnets 9 positioned in a square around the secondary coil 8. The secondary coil 8 and the permanent magnets 9 are mounted on a substrate 10. The hole 6, the primary coil 7 and the secondary coil 8 are round. The radii $r_c$, of the primary coil 7 and the secondary coil 8 are almost identical, whereas the radius $r_h$ of the hole 6 is about 1.1 to 1.25 times the radius $r_c$, to prevent unwanted eddy currents. The radius $r_c$, is about 10 cm. The distance between the holes 6 is about 1 cm.

The soft magnetic layer 5 is preferably made of an electrically conducting material such as a ferromagnetic material like iron or construction steel (ST7).

Figure 2:
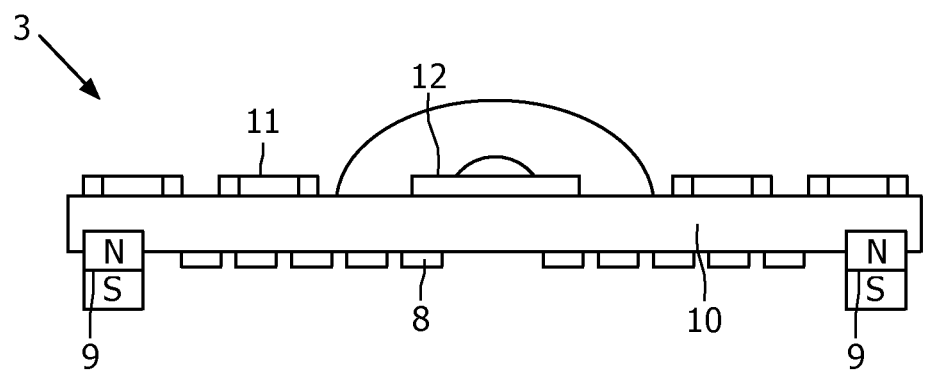
FIG. 2 is a side view of an electronic module of the electronic device according to the invention.

FIG. 2 shows a side view of an electronic module 3 according to the invention comprising a secondary coil 8 and four permanent magnets 9 mounted on one side of a substrate 10 and electronic components 11 and an electronic element like a light emitting diode (LED) 12 mounted on the other side of the substrate 10. The electronic components 11 and the LED 12 are electrically connected to the secondary coil 8. The electronic module 3 may also comprise means for shielding the environment against the magnetic field to comply with EMC requirements. The permanent magnets 9 are magnetized normal to the substrate 10 and normal to the soft magnetic layer 5 in use.

When mounting the electronic module 3 on the base part 2 the permanent magnets 9 will be attracted by magnetic force to the soft magnetic layer 5 and hold the electronic module 3 against the base part 2. Since the permanent magnets 9 are located around the secondary coil 8 and the soft magnetic layer 5 is located around the primary coils 7, the secondary coil 8 will be automatically align with respect to one of the primary coils 7. The primary coils 7 are connected to a driver which can drive the primary coils 7 with an AC field, preferably in the range of 0.1 MHz-10 MHz. The driver may include a detection mechanism to sense whether a secondary coil 8 is present opposite a primary coil 7 to activate this primary coil 7 at high power.

Figure 3:
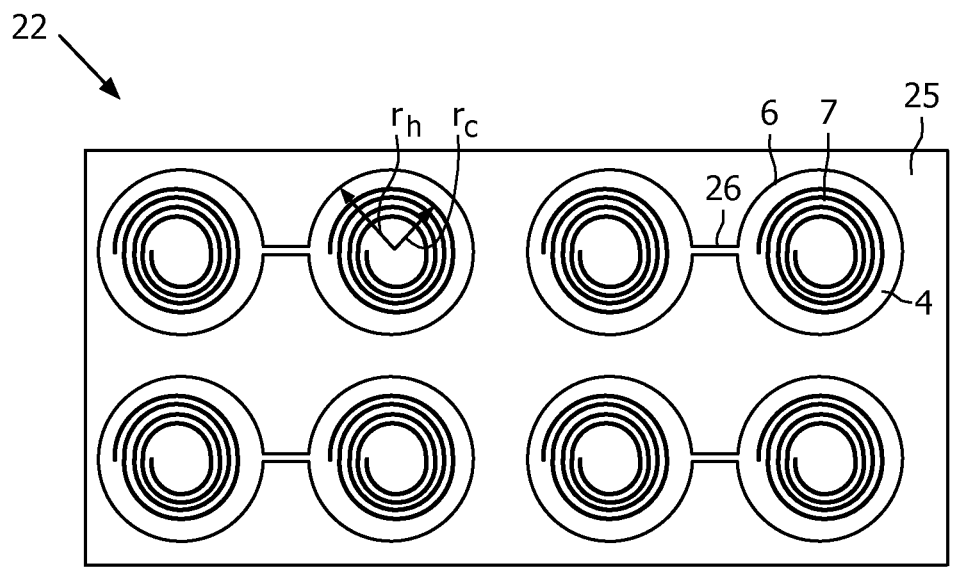
FIG. 3 is a top view of a second embodiment of a base part of the electronic device according to the invention.

FIG. 3 shows a top view of a second embodiment of a base part 22 of an electronic module according to the invention. The base part 22 comprises a substrate 4, a soft magnetic layer 25 provided with a number of holes 6 and a number of primary coils 7. Between pairs of holes 6 a slit 26 extends. The slit 26 can be manufactured in the soft magnetic layer 25 by means of mechanical tooling like milling or sawing, etched using photolithography or cut by a laser.

The slit 26 is provided to prevent that eddy currents occur when the primary coil 7 is powered. Such eddy currents will limit the efficiency of energy transfer to the secondary coil 8 and will generate heat in the soft magnetic layer 25.

By having one slit 26 per two holes 6, the number of slits 26 is limited and will hardly influence the mechanical strength of the soft magnetic layer 25.

Figure 4:
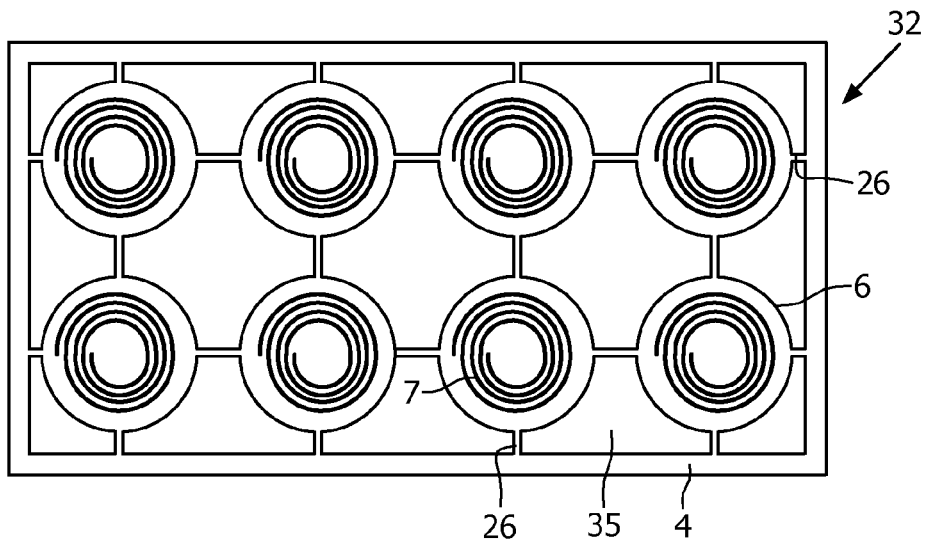
FIG. 4 is a top view of a third embodiment of a base part of the electronic device according to the invention.

FIG. 4 shows a top view of a third embodiment of a base part 32 of an electronic module according to the invention. The base part 32 comprises a substrate 4, a soft magnetic layer 35 provided with a number of holes 6 and a number of primary coils 7. Between each hole 6 and its adjacent holes 6 a slit 26 extends, which divides the soft magnetic layer 35 in several pieces. The pieces of the soft magnetic layer 35 are mounted on the substrate 4. Due to the larger number of slits near each primary coil 7, eddy currents are prevented even better.

Figure 5:
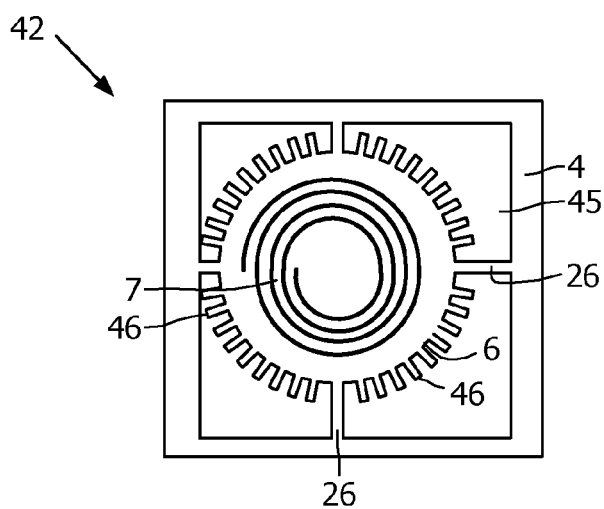
FIG. 5 is a top view of a fourth embodiment of a base part of the electronic device according to the invention.

FIG. 5 shows a top view of a fourth embodiment of a base part 42 of an electronic module according to the invention. The base part 42 comprises a substrate 4, a soft magnetic layer 45 provided with a number of holes 6 and a number of primary coils 7. Between each hole 6 and its adjacent holes 6 a slit 26 extends, which divides the soft magnetic layer 45 in several pieces. The pieces of the soft magnetic layer 35 are mounted on the substrate 4. Furthermore a large number of relatively short, radially extending slits 46 are provided around each hole 6.

Due to the slits 46 the occurrence of unwanted eddy currents is further reduced. These slits 46 have nearly no influence on the function of the permanent magnets 9 because the magnet flux can still flow in the direction of the remaining soft magnetic material of the soft magnetic layer 45.

The better eddy currents are being prevented by means of the slits, the smaller the difference in diameter between the primary coil 7 and the hole 6 can be.

It is also possible to provide soft magnetic material in the centre of the primary coil 7 and to provide the electronic module 3 with a centrally located permanent magnet 9.

It is also possible to use square coils or other shaped coils. In such a case, the hole has preferably the same shape as the primary coil.

It is possible to provide the base part 2 with a non magnetic cover layer to hide the primary coils from view.

It is also possible to have more than one primary coil in each hole.

It is also possible to use more or less than four magnets or to use a ring shaped magnet.

It is also possible to make the soft magnetic layer out of a number of small pieces of soft magnetic material being positioned between and near the primary coils.

It is also possible to use electromagnets instead of one or more permanent magnets, which electromagnets can be powered by the secondary coil.

Instead of a LED 12, the electronic module 3 may comprise any other kind of electronic element which can be powered by means of the secondary coil, like an OLED or a small camera, speaker, sensor, electric fan, radio device, antenna, LCD display etcetera.

The invention claimed is:

1. An electronic device comprising
   a base part comprising
      a soft magnetic layer defining a through hole and
      at least a primary coil, and
   an electronic module, comprising at least one electronic element and at least a secondary coil configured to inductively interact with the primary coil, wherein the primary coil is located in the hole of the soft magnetic layer, and wherein the electronic module further comprises at least one magnet adapted to magnetically interact with the soft magnetic layer.

2. An electronic device according to claim 1, wherein the primary coil and the hole are substantially round, wherein the diameter of the hole is at least 10% larger than the diameter of the primary coil.

3. An electronic device according to claim 1, wherein the hole in the soft magnetic layer is a blind hole.

4. An electronic device according to claim 1, wherein the soft magnetic layer comprises at least one slit extending from the hole.

5. An electronic device according to claim 1, wherein the soft magnetic layer comprises a number of slits extending radially from the hole.

6. An electronic device according to claim 1, wherein the soft magnetic layer is provided with a number of primary coils located in holes, wherein at least one slit extends between adjacent holes.

7. An electronic device according to claim 1, wherein the dimensions of the primary coil and the secondary coil are about the same.

8. An electronic device according to claim 1, wherein the electronic module comprises at least one permanent magnet.

9. An electronic device according to claim 8, wherein the electronic module comprises at least three permanent magnets located around the secondary coil at a regular spacing.

10. An electronic device according to claim 8, wherein three permanent magnets are located in a triangle around the secondary coil.

11. An electronic device according to claim 8, wherein four permanent magnets are located in a square around the secondary coil.

12. An electronic device according to claim 8, wherein the permanent magnet is magnetized normal to the soft magnetic layer.

13. An electronic device, comprising:
   a base part comprising
      a soft magnetic layer defining a hole and
      at least a primary coil, and
   an electronic module, comprising
      at least one electronic element,
      at least a secondary coil adapted to inductively interact with the primary coil, wherein the primary coil is located in the hole of the soft magnetic layer, and
      at least one magnet adapted to magnetically interact with the soft magnetic layer, wherein the soft magnetic layer is provided with a number of primary coils located in holes, wherein at least one slit extends between adjacent holes.

14. An electronic device according to claim 13, wherein the at least one magnet is a permanent magnet.

15. An electronic device according to claim 14, wherein the electronic module comprises at least three permanent magnets located around the secondary coil at a regular spacing.

16. An electronic device according to claim 14, wherein the permanent magnet is magnetized normal to the soft magnetic layer.

* * * * *